(12) United States Patent
Ikoma et al.

(10) Patent No.: US 8,578,221 B1
(45) Date of Patent: Nov. 5, 2013

(54) METHOD AND SYSTEM FOR MEASURING BIT ERROR RATE AND BLOCK ERROR RATE OF DEVICE UNDER TEST

(75) Inventors: Tetsuaki Ikoma, Hyogo (JP); Shuji Kubo, Hyogo Prefecture (JP); Takuya Yoshimura, Hyogo Prefecture (JP); Ikura Yoshida, Hyogo Prefecture (JP)

(73) Assignee: Agilent Technologies, Inc., Santa Clara, CA (US)

( * ) Notice: Subject to any disclaimer, the term of this patent is extended or adjusted under 35 U.S.C. 154(b) by 343 days.

(21) Appl. No.: 12/977,189

(22) Filed: Dec. 23, 2010

(51) Int. Cl.
*G06F 11/00* (2006.01)

(52) U.S. Cl.
USPC ............................ 714/707; 714/712; 714/715

(58) Field of Classification Search
USPC ......................................... 714/707, 712, 715
See application file for complete search history.

(56) References Cited

U.S. PATENT DOCUMENTS

| | | | |
|---|---|---|---|
| 5,937,005 A * | 8/1999 | Obuchi et al. | 375/224 |
| 6,553,041 B1 * | 4/2003 | Borneman et al. | 370/522 |
| 6,961,317 B2 * | 11/2005 | Abramovitch et al. | 370/252 |
| 7,299,021 B2 * | 11/2007 | P rssinen et al. | 455/226.1 |
| 2006/0250972 A1 * | 11/2006 | Seebacher et al. | 370/242 |
| 2006/0258293 A1 * | 11/2006 | Steffen et al. | 455/67.11 |
| 2007/0091814 A1 * | 4/2007 | Leung et al. | 370/252 |

* cited by examiner

*Primary Examiner* — Charles Ehne

(57) ABSTRACT

A method is provided for determining a measure of error of a device under test (DUT). The method includes storing baseband data received from the DUT in a storage device, segmenting the baseband data into multiple data segments, determining processing parameters for one data segment of the plurality of data segments, and storing the determined processing parameters for the one data segment. The method further includes retrieving additional data segments of the multiple data segments from the storage device, and processing the additional data segments using the stored processing parameters for the one data segment. The measure of error of the DUT is determined based at least in part on data from the processed additional data segments.

20 Claims, 3 Drawing Sheets

METHOD AND SYSTEM FOR MEASURING BIT ERROR RATE AND BLOCK ERROR RATE OF DEVICE UNDER TEST

BACKGROUND

Tests determining various measures of error, such as bit error rate (BER) and block error rate (BLER) (also referred to as packet error rate (PER)), are used to evaluate performance of signal receivers, such as radio frequency (RF) receivers in wireless telecommunication systems. BER and BLER tests, in particular, are commonly required by conformance tests for wireless communication standards, such as Wideband Code Division Multiple Access (WCDMA), Worldwide Interoperability for Microwave Access (WiMAX), Long Term Evolution (LTE), and the like. Likewise, BER and BLER tests may be required for wireless devices or systems configured in accordance with various high-speed interface standards. For example, the Common Public Radio Interface (CPRI) standard defines an internal digital interface between Radio Equipment (RE) and the corresponding Radio Equipment Controller (REC). Similarly, the DigRF standard defines an internal digital interface between Radio Frequency IC (RFIC) and the corresponding Baseband IC (BBIC).

When testing devices or systems with respect to high-speed interface standards, the device under test (DUT), e.g., the RE in the CPRI standard and the RFIC in the DigRF standard, has a down-converter and an analog-to-digital converter (ADC). Accordingly, the DUT is able to generate digital in-phase and quadrature (IQ) baseband data from an RF input signal after some front-end processing, such as filtering and automatic gain control (AGC).

Because of the large amount of IQ baseband data output by the DUT, conventional BER and BLER testing of an internal high-speed interface cannot be performed adequately using standard test equipment, such as a typical signal analyzer. Rather, the BER and BLER testing requires use of dedicated test hardware designed to process large amounts of data at a very high speed. For example, when the DUT is an RE according to the CPRI standard or an RFIC according to the DigRF standard, the DUT is connected to a dedicated test apparatus that simulates the REC or the BBIC, respectively. The dedicated test apparatus has the capability of demodulating and decoding signals output by the DUT, and thus is able to detect error bits or frame errors. Additional software may accumulate results to calculate the BER and BLER of the DUT. However, manufacturers of the DUTs (e.g., the REs and RFICs) typically do not have dedicated test apparatuses capable of calculating the BER and BLER, particularly when they do not also manufacture the RECs or BBICs.

An alternative conventional approach is to send the IQ baseband data from the DUT to a computer, such as a personal computer (PC) or a laptop computer. The computer executes a software program, such as SystemVue or Advanced Design System (ADS) available from Agilent Technologies, or MATLAB available from MathWorks, which processes the IQ baseband data by demodulating and decoding the IQ baseband data and performing the BER and BLER calculation. However, such calculation of the BER and BLER is very time consuming in order to obtain reliable results by processing a large amounts of data, particularly under low bit error rate conditions.

As a result, the manufacturers do not have an efficient or inexpensive way in which to test BER and BLER performance of the high-speed interfaces, for example, of REs and RFICs. The testing issue becomes more difficult for higher speed wireless communications, such as next generation wireless broadband standard, LTE (4G).

SUMMARY

In a representative embodiment, a method of determining a measure of error of a device under test (DUT) is provided. The method includes storing baseband data received from the DUT in a storage device, segmenting the baseband data into multiple data segments, determining processing parameters for one data segment of the multiple data segments, and storing the determined processing parameters for the one data segment. The method further includes retrieving additional data segments of the multiple data segments from the storage device, processing the additional data segments using the stored processing parameters for the one data segment, and determining the measure of error of the DUT based at least in part on data from the processed additional data segments.

In another representative embodiment, a method is provided for measuring at least one of bit error rate (BER) and block error rate (BLER) of a DUT using a signal analyzer. The method includes receiving baseband in-phase and quadrature (IQ) data from the DUT, derived from a radio frequency (RF) signal received by the DUT, the baseband IQ data including multiple frames, and processing an initial frame of the multiple frames. The processing of the initial frame includes determining a location of a synchronization pattern in an initial data segment corresponding to the initial frame, synchronizing the initial data segment using the determined synchronization pattern location to obtain the initial frame, estimating time offset and frequency offset of the initial frame, compensating for the estimated time offset and the estimated frequency offset, storing the synchronization pattern location, the estimated time offset and the estimated frequency offset, and demodulating and decoding data of the initial frame to generate initial frame data bits. The method further includes processing at least one subsequent frame of the multiple frames, where the processing of the at least one subsequent frame includes retrieving the stored synchronization pattern location, the stored estimated time offset and the stored estimated frequency offset, synchronizing at least one subsequent data segment corresponding to the at least one subsequent frame using the retrieved synchronization pattern location to obtain the at least one subsequent frame, compensating for the retrieved estimated time offset and the retrieved estimated frequency offset, and demodulating and decoding data of the at least one subsequent frame to generate subsequent frame data bits. The at least one of the BER and the BLER of the DUT is determined using generated data bits, including the initial frame data bits and the subsequent frame data bits.

In another representative embodiment, a system for determining a measure of error of a DUT includes a storage device, a controller, a signal analyzing device and a computer system. The storage device is configured to store baseband data received from the DUT. The controller is configured to retrieve the stored baseband data from the storage device and to segment the retrieved baseband data into multiple data segments. The signal analyzing device includes a first processing path for processing an initial data segment of the data segments, a second processing path for processing subsequent data segments of the data segments, a switch for switching between the first and second processing paths under control of the controller and a memory. The computer system is configured to determine the at least one of the BER and the BLER of the DUT based on the processed initial data segment from the first processing path and the processed subsequent data segments from the second data path.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
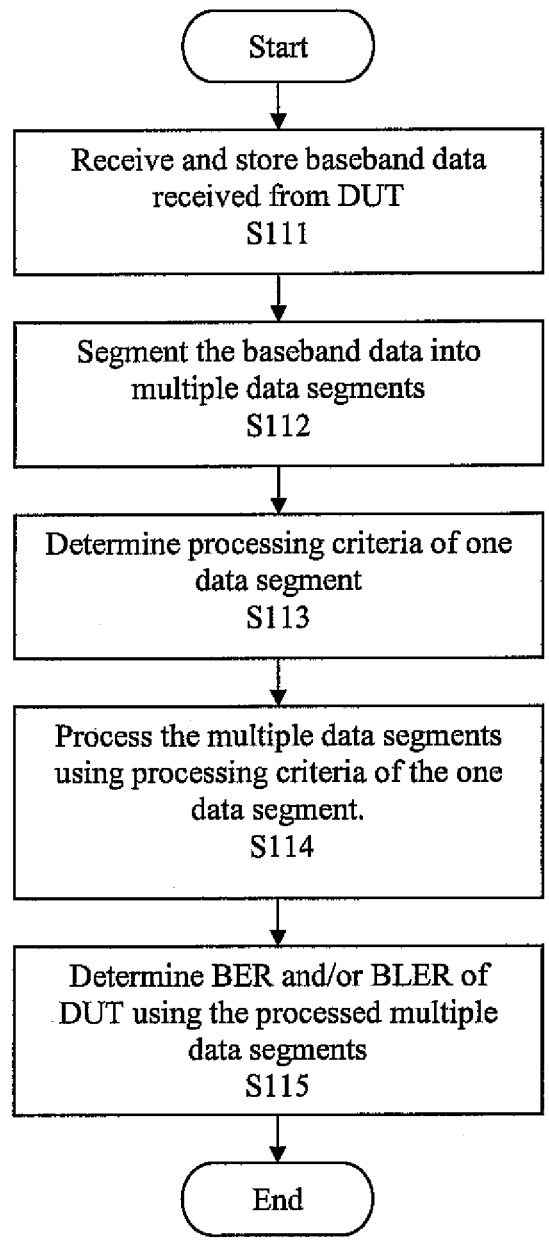
FIG. 1 is a flowchart illustrating a method of determining BER/BLER of a wide bandwidth, high data rate signal, according to a representative embodiment.

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

Generally, it is understood that the drawings and the various elements depicted therein are not drawn to scale. Further, relative terms, such as "above," "below," "top," "bottom," "upper," "lower," "left," "right," "vertical" and "horizontal," are used to describe the various elements' relationships to one another, as illustrated in the accompanying drawings. It is understood that these relative terms are intended to encompass different orientations of the device and/or elements in addition to the orientation depicted in the drawings. For example, if the device were inverted with respect to the view in the drawings, an element described as "above" another element, for example, would now be "below" that element. Likewise, if the device were rotated 90 degrees with respect to the view in the drawings, an element described as "vertical," for example, would now be "horizontal."

Generally, various representative embodiments provide methods and systems for efficiently measuring BER and/or BLER of wide bandwidth and high data rate baseband data signals output by a DUT, without using dedicated hardware specially designed to accommodate the baseband signals. Further, various representative embodiments provide methods and systems for increasing speed and thus reducing time of performing BER and/or BLER measurements of wide bandwidth and high data rate baseband data signals output by a DUT, using a conventional apparatus for measuring error vector magnitude (EVM) modulation quality, such as a conventional signal analyzer. That is, a conventional signal analyzer that measures EVM, for example, may be configured to measure BER/BLER by adding decoding capability, according to various embodiments. The wide bandwidth and high data rate baseband data signals may be signals compliant with CPRI or DigRF high-speed interface standards for modern, wideband wireless communication systems, for example.

FIG. 1 is a flowchart illustrating a method of determining BER and BLER of a wide bandwidth, high data rate signal, according to a representative embodiment. For example, the method depicted in FIG. 1 may be used for testing BER and BLER of a high-speed interface of a DUT capable of receiving RF signals and outputting high data rate baseband data, such as an RE according to the CPRI standard or an RFIC according to the DigRF standard. The method may be implemented in whole or in part by one or more processing devices, such as controller 320 and signal analyzer 330, described below with reference to FIG. 3. For example, the method may be implemented by one or more processors, application specific integrated circuits (ASICs), field-programmable gate arrays (FPGAs), or combinations thereof, using software, firmware, hard-wired logic circuits, or combinations thereof. When using a processor, a memory is included for storing executable software/firmware and/or executable code that allows it to perform the various functions.

Referring to FIG. 1, baseband data is received from the DUT and stored in memory in block S111. Subsequent processing may be performed on the stored baseband data, substantially in real-time as the baseband data is being received, in which case the baseband data is effectively buffered. Also, the subsequent processing may be performed on the stored baseband data at a later time.

In block S112, the baseband data is retrieved from the memory and segmented into multiple data segments. Due to the large amount of data, segmenting the baseband data in data segments is performed at the rate the baseband data is extracted from the memory. Each data segment may correspond to a length of a frame (frame length) of the baseband data, for example, or to an integer multiple of a frame length, although baseband data may be segmented according to units other than frame length, without departing from the scope of the present teachings. Generally, a frame is a unit of data transmission in a predetermined time (e.g., 10 msec for WCDMA and LTE wireless communication standards), which constitutes the frame length. A frame may include information data control data, special data, and the like, and is transmitted time-aligned or synchronized with other frames by a transmitter (e.g., base station).

Processing parameters for processing the baseband data are determined for one data segment in block S113, which may be referred to as an initial data segment. The processing parameters may include any information needed to demodulate, decode and/or analyze the initial data segment, such as determining segment synchronization information for synchronizing the initial data segment and estimating signal impairments including time offset, frequency offset and the like, for example. For simplicity, the initial data segment for which the processing parameters are determined may be the first data segment among the multiple data segments received from the DUT, although another data segment may be selected and designated the initial data segment, without departing from the scope of the present teachings.

In block S114, the multiple data segments are processed using the processing parameters determined for the initial data segment in block S113, including the initial data segment, as well as the remaining data segments of the multiple data segments, which may be referred to as additional data segments or subsequent data segments. In other words, in order to save processing time and resources, it is assumed that the processing parameters determined for the initial data segment sufficiently represents the corresponding processing parameters of the additional data segments to enable accurate processing of the subsequent data segments. For example, the processing parameters determined for the initial data segment may be stored as intermediate processing values, and the processing parameters may then be retrieved in order to process the additional data segments.

The BER and/or BLER of the DUT may then be calculated based on the processed (initial and additional) data segments in block S115. For example, the processing of the multiple data segments may include performing synchronization and signal impairment compensation for each data segment, demodulating and decoding each data segment, and detecting the corresponding bit and frame errors. The BER and/or BLER of the DUT may then be calculated using the bit and frame errors detected for the multiple data segments. In various embodiments, all or a portion of the processing may be performed as each data segment is consecutively retrieved from the memory and segmented, or may be performed after two or more data segments have been retrieved and/or partially processed.

Figure 2:
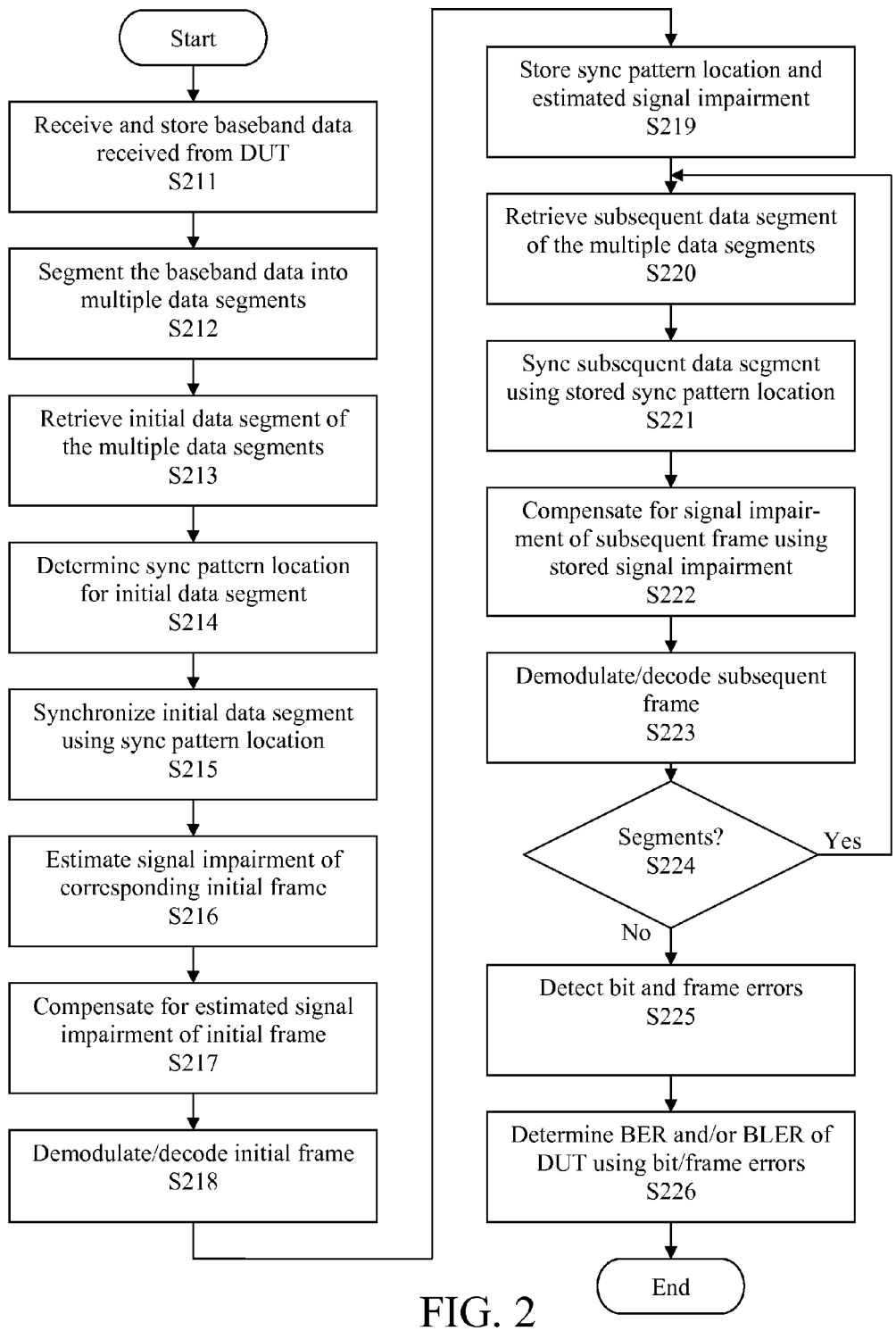
FIG. 2 is a flowchart illustrating a method of determining BER/BLER of a wide bandwidth, high data rate signal, according to a representative embodiment.

FIG. 2 is a flowchart illustrating a method of determining BER and BLER of a wide bandwidth, high data rate signal, according to a representative embodiment. In particular, FIG. 2 provides a more detailed, non-limiting example of determining BER and BLER of a DUT for purposes of illustration.

The method depicted in FIG. 2 may be used for testing BER and BLER of a high-speed interface of a DUT capable of receiving wide bandwidth, high data rate RF signals and outputting wide bandwidth, high data rate baseband data. Examples of the DUT include an RE configured according to the CPRI standard or an RFIC configured according to the DigRF standard. The method of FIG. 2 may be implemented in whole or in part by one or more processing devices, such as controller 320, signal analyzer 330 and/or computer system 340, described below with reference to FIG. 3. For example, the method may be implemented by one or more processors, ASICs, FPGAs, or combinations thereof, using software, firmware, hard-wired logic circuits, or combinations thereof. When using a processor, a memory is included for storing executable software/firmware and/or executable code that allows it to perform the various functions.

Referring to FIG. 2, baseband data is received from the DUT and stored in memory in block S211. Subsequent processing may be performed on the stored baseband data after the baseband data has been stored. Alternatively, the processing may be performed in near real-time, as the baseband data is being received, in which case the baseband data is effectively buffered.

In block S212, the baseband data is retrieved from the memory and segmented into multiple data segments, each data segment consisting of one frame length of data, for example. In alternative implementations, the baseband data may be segmented such that each data segment consists of an integer multiple of one frame length of data. That is, two or more frame lengths of data may be included in each data segment, although each data segment has the same number of frame lengths of data. Due to the large amount of data, segmenting the baseband data into frame lengths of data may be performed at the rate the baseband data is extracted from the memory.

An initial data segment from among multiple data segments is retrieved in block S213. In an embodiment, the initial data segment is the first data segment of the baseband data, although another data segment may be selected as the initial data segment, without departing from the scope of the present teachings. Processing of the initial data segment begins with detecting the location of a synchronization pattern or symbol in the initial data segment in block S214, and synchronizing the initial data segment to a segment or frame boundary using the detected location of the synchronization pattern in block S215 (referred to as frame synchronization). For example, a downlink signal according to the LTE wireless communication standard has dedicated synchronization symbols, called primary and secondary synchronization signals, which are used for frame synchronization, and the frame boundary is calculated using the location of the synchronization signal in the frame. After synchronization of the initial data segment, a frame location is known and the initial data segment may be referred to as the initial frame.

The processing continues in block S216, where signal impairments of the initial frame are estimated. For example, in block S216, estimating signal impairments may include estimating time offset and/or frequency offset of the initial frame. Compensation for the estimated signal impairments, such as time offset and/or frequency offset, is performed for the initial frame in block S217.

In block S218, the initial frame is demodulated, and the frame symbols are detected and decoded, to provide the corresponding data bits of the initial frame. Meanwhile, the location of the synchronization pattern determined in block S214 and the estimated signal impairments determined in block S216 are stored in a memory in block S219 as intermediate processing values. Notably, the order of the steps shown in FIG. 2 are not limiting, and thus the storing indicated in block S219 may occur at any time during the processing of blocks S214-S218, discussed above.

In blocks S220-S224, the remaining data segments (one or more data segments in addition to the initial data segment) are sequentially retrieved and processed. In an embodiment, the remaining data segments are retrieved (and processed) in order following the initial segment, and thus may be referred to as subsequent segments, although the order in which the remaining data segments are retrieved and/or processed may vary, without departing from the scope of the present teachings. In addition, all or a portion of the processing of the subsequent data segments may be performed substantially simultaneously, without departing from the scope of the present teachings.

In particular, a subsequent data segment is retrieved in block S220, e.g., from the memory discussed with reference to block S211. Unlike the initial data segment, there is no detection of a synchronization pattern location or estimation of signal impairments with respect to the subsequent data segment. Rather, the subsequent data segment is synchronized in block S221 using the previously stored synchronization pattern location determined for the initial data segment to obtain a corresponding subsequent frame. Likewise, compensation for the signal impairments of the subsequent frame is performed in block S222 using the previously stored signal impairments estimated for the initial frame. This saves time and resource allocation in processing the subsequent frame. In block S223, the subsequent frame is demodulated and the frame symbols are detected and decoded, to provide the corresponding data bits of the subsequent frame. During the demodulation in block S223, fine adjustments and compensations of impairments, which are not completely compensated for in block S222, may be made to obtain better results.

In block S224, it is determined whether there are any more subsequent data segments to be processed. When there are additional subsequent data segments (block S224: Yes), the process returns to block S220 to retrieve the next subsequent data segment, which is processed in accordance with blocks S221-S223, as discussed above. The loop is repeated until all of the subsequent data segments are sequentially processed.

When there are no more subsequent data segments (block S224: No), the data bits of the demodulated and decoded initial and subsequent frames are used to detect bit errors and frame errors in block S225. Bit errors may be detected, for example, by comparing the data bits with a reference bit sequence, and frame errors may be detected, for example, by checking error status of parity (CRC) bits, although other methods of bit and error detection may be incorporated without departing from the scope of the present teachings. In addition, although FIG. 2 depicts the detection of bit and frame errors in block S225 as occurring after all of the frames (initial and subsequent frames) have been demodulated and decoded, it is understood that the bit and frame error detection in block S225 may be performed sequentially with respect to each frame upon being demodulated and decoded, that is, without waiting for the other frames to be demodulated and decoded. Likewise, the bit and frame error detection in block S225 may be performed on a predetermined number of frames in groups, some time prior to all of the frames being demodulated and detected.

In block S226, the BER and/or the BLER of the DUT is calculated using the bit errors and frame errors detected in block S225. For example, BER may be calculated by dividing the number of error bits by the total number of data bits. Also, for example, BLER may be calculated by dividing the number of error blocks, frames or subframes by the total number of blocks, frames or subframes, respectively. Various other methods for calculating the BER and/or the BLER, as well as calculation of other DUT measurement criteria based on bit and frame errors, may be incorporated without departing from the scope of the present teachings.

Figure 3:
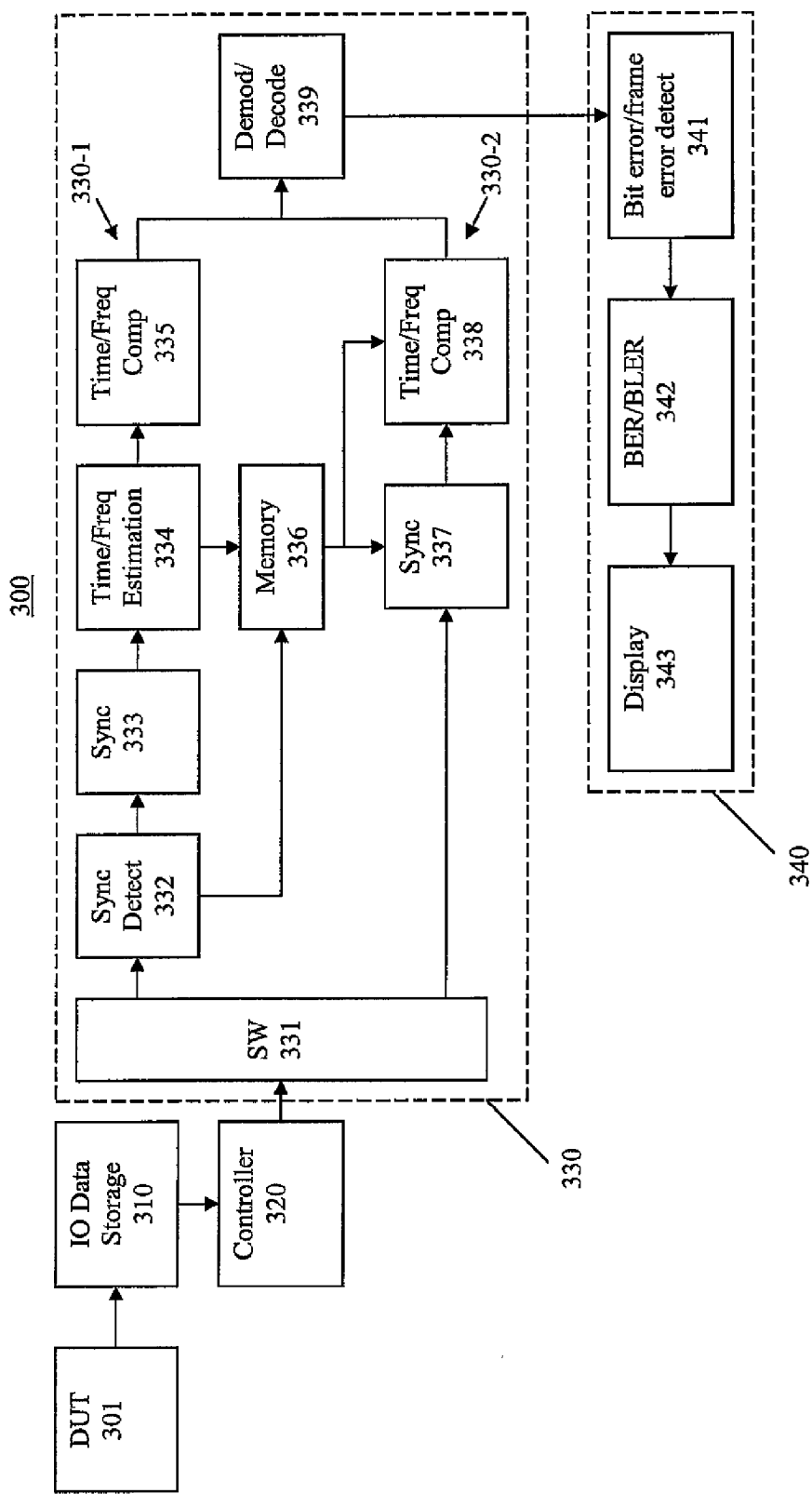
FIG. 3 is a functional block diagram illustrating a system for determining BER/BLER of a wide bandwidth, high data rate signal, according to a representative embodiment.

FIG. 3 is a functional block diagram illustrating a system for determining BER and BLER of a wide bandwidth, high data rate signal, according to a representative embodiment.

Referring to FIG. 3, BER/BLER detection system 300 includes input/output (IO) data storage device 310, controller 320, signal analyzer 330, and computer system 340, which are configured to receive and process test signals from DUT 301. The DUT 301 may be an RE using the CPRI standard or an RFIC using the DigRF standard, for example, as discussed above.

The BER/BLER detection system 300 receives digital IQ baseband data output by the DUT 301 as a signal under test (SUT), and stores the received IQ baseband data in IO data storage device 310. In various configurations, the IO data storage device 310 of the BER/BLER detection system 300 may be shared with the DUT 301, or may used exclusively by the BER/BLER detection system 300. The IO data storage device 310 may be implemented as any number, type and combination of tangible computer readable storage media, including read-only memory (ROM) and/or random access memory (RAM), such as disk drives, electrically programmable read-only memory (EPROM), electrically erasable and programmable read-only memory (EEPROM), CDs, DVDs, universal serial bus (USB) drives, and the like.

The IQ baseband data is stored (or effectively buffered) in the IO data storage device 310 because the bandwidth and data rate of the IQ baseband data exceed the capacity (e.g., processing speed) of the signal analyzer 330, as discussed above. For example, the signal analyzer 330 may be designed for measuring EVM modulation quality, such as a N9020A MXA signal analyzer or N9030A PXA signal analyzer, available from Agilent Technologies, Inc. Therefore, as a practical matter, the signal analyzer 330 would not be able to process directly the large amount of data required to calculate BER/BLER, particularly for wide bandwidth and high data rate systems, such as WCDMA, WiMAX and LTE, due to limitations in memory, data transfer speed and processor performance, and the like.

The controller 320 monitors the status of the IO data storage device 310, and once monitoring indicates that the IQ baseband data are stored (or partially stored) in the IO data storage device 310, the controller 320 begins processing the IQ baseband data. Alternatively, the DUT 301 and/or the IO storage device 310 may be configured to send a trigger signal to the controller 320 to begin processing in response to the trigger signal when the IQ baseband data become available. The IO data storage device 310 and the controller 320 are depicted as separate units, for purposes of discussion. However, in various embodiments, one or both of the IO data storage device 310 and the controller 320 may be entirely or partially included within the signal analyzer 330 and/or the computer system 340, without departing from the scope of the present teachings.

The controller 320 retrieves and outputs the IQ baseband data at a slower rate, compatible with operation of the signal analyzer 330. As the controller 320 retrieves the IQ baseband data, it separates the IQ baseband data into data segments, where each data segment is a frame length or an integer multiple of the frame length of data. For purposes of illustration, it is assumed that each data segment is one frame length of the baseband data, as discussed above, although other sizes and types of data segments may be used. For example, total data required for BER/BLER computation of LTE wireless communication signals ranges from about 100 frames to about 1000 frames of data, where each frame of data has a frame length of 10 msec. Therefore, in this example, one data segment provided by the controller 320 is one frame length (10 msec), which the signal analyzer 330 is able to handle, one at a time.

The controller 320 sequentially provides the data segments to the signal analyzer 330. More particularly, the controller 320 controls switch 331 of the signal analyzer 330 to select one of first path 330-1 or second path 330-2 with respect to each data segment of the IQ baseband data, depending on whether the data segment is an initial data segment or a subsequent data segment. As discussed above, the initial data segment is used to determine processing parameters, such as synchronization pattern location and time and/or frequency offset, while the subsequent data segments skip the processing parameter determination, and instead use the previously determined processing parameters of the initial data segment.

The first path 330-1 processes an initial data segment, and includes synchronization detection circuit 332, synchronization circuit 333, time/frequency offset estimation circuit 334, and time/frequency offset compensation circuit 335. The synchronization detection circuit 332 and the time/frequency offset estimation circuit 334 perform preliminary processing of the initial data segment and the corresponding initial frame, to generate intermediate processing results, which are stored in memory 336, as discussed below. More particularly, the synchronization detection circuit 332 detects the location of the synchronization pattern in the initial data segment. The synchronization circuit 333 synchronizes with a boundary of the initial data segment using the detected location of the synchronization pattern from the synchronization detection circuit 332, to provide a corresponding, synchronized initial frame. The time/frequency offset estimation circuit 334 estimates signal impairments of the initial frame, examples of which are time offset and frequency offset, for purposes of illustration. The time/frequency offset compensation circuit 335 compensates for the estimated time offset and frequency offset provided by the time/frequency offset estimation circuit 334.

The synchronization pattern location, determined by the synchronization detection circuit 332, and the estimated time and frequency offsets, determined by the time/frequency offset estimation circuit 334, are stored in the memory 336 of the signal analyzer 330. The memory 336 may be implemented as any number, type and combination of tangible computer readable storage media, including ROM and/or RAM, such as disk drives, EPROM, EEPROM, CDs, DVDs, USB drives, and the like. The memory 336 is depicted or separate from the JO storage device 310, discussed above, although the memory 336 and the IO storage device 310 may be combined in various alternative configurations. That is, the memory 336 may be a memory internal or external to the signal analyzer 330.

The second path 330-2 sequentially processes subsequent data segments provided by the controller 320 via the switch 331. The subsequent data segments include one or more frame lengths of IQ baseband data, other than the IQ baseband data of the initial data segment. The second path 330-2 includes synchronization circuit 337 and time/frequency offset compensation circuit 338, but does not include a detection circuit (such as synchronization detection circuit 332) or a time/frequency offset estimation circuit (such as time/frequency offset estimation circuit 334), as does the first path 330-1. Rather, the synchronization circuit 337 and the time/frequency offset compensation circuit 338 of the second path 330-2 retrieve the synchronization pattern location and the estimated time and frequency offsets previously stored in the memory 336 based on the processing of the initial data segment and/or corresponding initial frame. In other words, the subsequent data segments of the IQ baseband data are synchronized with frame boundaries, and timing and frequency offsets are adjusted, using the intermediate processing values previously stored in the memory 336, without having to determine these processing values directly from the IQ baseband data. As a result of skipping the preliminary processing steps in the second path 330-2, the processing time for measuring the BER and/or BLER is reduced significantly.

In an embodiment, the second path 330-2 processes all of the remaining data segments stored in the IO data storage device as subsequent data segment. In alternative embodiments, the second path 330-2 processes a predetermined number of additional subsequent data segments and corresponding subsequent frames, for example, the minimum number of frames required to calculate the BER and/or BLER of the DUT 301.

Both the first path 330-1 and the second path 330-2 output synchronized, time and frequency compensated frames of the IQ baseband data to demodulator/decoder 339. The demodulator/decoder 339 demodulates symbols of the frames of the IQ baseband data, and decodes the demodulated symbols to generate data bits. During demodulation, the demodulator/decoder 339, fine adjustments and compensations of impairments which are not completely compensated in 338 can be compensated to get better results.

The data bits are output from the signal analyzer 330 to the computer system 340, which includes bit error/frame error detection module 341, BER/BLER calculation module 342, and display 343. The various modules shown in the computer system 340 may be physically implemented using a software-controlled processor, hard-wired logic circuits, firmware, or a combination thereof. Also, while the modules are functionally segregated in the computer system 340 for explanation purposes, they may be combined variously in any physical implementation. The computer system 340 may include any of a variety of types of computers or microprocessors, such as a PC, a laptop, or the like, e.g., executing an operating system, such as Windows operating systems available from Microsoft Corporation, NetWare operating system available from Novell, Inc., or Unix operating system available from Sun Microsystems, Inc. The computer system 340 may include various I/O devices (not shown), such as a keyboard, key pad, a track ball, a mouse, a touch pad or touch-sensitive display, and the like. Various information may be displayed on the display 343 through a display interface (not shown), which may include a graphical user interface (GUI).

The bit error/frame error detection module 341 receives the data bits generated by the demodulator/decoder 339, and detects bit errors by comparing the data bits with a reference bit sequence. The bit error/frame error detection module 341 also detects frame errors by checking error status of parity (CRC) bits. The BER/BLER calculation module 342 accumulates detected bit errors from bit error/frame error detection module 341 to calculate the BER of the DUT 301, e.g., by dividing the number of accumulated error bits by the total number of data bits. The BER/BLER calculation module 342 may also calculate the BLER of the DUT 301, e.g., by dividing the number of error blocks, frames or subframes by the number of total blocks, frames or subframes, respectively. The results may be displayed on the displayed 343 and/or stored in a test database (not shown).

While specific embodiments are disclosed herein, many variations are possible, which remain within the concept and scope of the invention. Such variations would become clear after inspection of the specification, drawings and claims herein. The invention therefore is not to be restricted except within the scope of the appended claims.

What is claimed is:

1. A method of determining a measure of error of a device under test (DUT), the method comprising:
   storing baseband data received from the DUT in a storage device;
   segmenting the stored baseband data into a plurality of data segments;
   determining processing parameters for processing one data segment of the plurality of data segments;
   storing the determined processing parameters for the one data segment;
   retrieving additional data segments of the plurality of data segments from the storage device;
   processing the additional data segments using the stored processing parameters determined for the one data segment; and
   determining the measure of error of the DUT based at least in part on data from the processed additional data segments.

2. The method of claim 1, wherein each data segment of the plurality of data segments comprises a frame length of a frame of the baseband data or a multiple of the frame length of the frame of the baseband data.

3. The method of claim 1, wherein determining the processing parameters for the one data segment comprises determining a location of a synchronization pattern in the one data segment and estimating a signal impairment of the one data segment.

4. The method of claim 3, wherein processing the additional data segments using the stored processing parameters for the one data segment comprises:
   synchronizing the additional data segments using the synchronization pattern location of the one data segment; and compensating for signal impairments the additional data segments using the estimated signal impairment of the one data segment.

5. The method of claim 4, wherein estimating the signal impairment of the one data segment comprises estimating at least one of a time offset and a frequency offset of the one data segment.

6. The method of claim 1, wherein determining the measure of error of the DUT comprises:
demodulating symbols of the plurality of data segments;
decoding the demodulated symbols to generate corresponding data bits; and
determining the at least one of a bit error rate (BER) and a block error rate (BLER) of the DUT using the decoded data bits.

7. The method of claim 6, wherein determining the at least one of the BER and the BLER of the DUT using the decoded data bits comprises:
calculating bit errors by comparing the decoded data bits to a reference bit sequence;
accumulating the calculated bit errors; and
calculating the BER of the DUT using the accumulated bit errors.

8. The method of claim 1, further comprising:
receiving a trigger signal from the DUT to begin determining the measure of error.

9. The method of claim 1, wherein the storage device is shared by the DUT.

10. The method of claim 1, wherein the baseband data is compliant with a Common Public Radio Interface (CPRI) standard.

11. The method of claim 1, wherein the baseband data is compliant with a DigRF standard.

12. A method of measuring at least one of bit error rate (BER) and block error rate (BLER) of a device under test (DUT) using a signal analyzer, the method comprising:
receiving baseband in-phase and quadrature (IQ) data from the DUT, derived from a radio frequency (RF) signal received by the DUT, the baseband IQ data comprising a plurality of frames;
processing an initial frame of the plurality of frames, the processing of the initial frame comprising:
determining a location of a synchronization pattern in an initial data segment corresponding to the initial frame;
synchronizing the initial data segment using the determined synchronization pattern location to obtain the initial frame;
estimating time offset and frequency offset of the initial frame;
compensating for the estimated time offset and the estimated frequency offset;
storing the synchronization pattern location, the estimated time offset and the estimated frequency offset; and
demodulating and decoding data of the initial frame to generate initial frame data bits;
processing at least one subsequent frame of the plurality of frames, the processing of the at least one subsequent frame comprising:
retrieving the stored synchronization pattern location, the stored estimated time offset and the stored estimated frequency offset;
synchronizing at least one subsequent data segment corresponding to the at least one subsequent frame using the retrieved synchronization pattern location to obtain the at least one subsequent frame;
compensating for the retrieved estimated time offset and the retrieved estimated frequency offset; and
demodulating and decoding data of the at least one subsequent frame to generate subsequent frame data bits; and
determining the at least one of the BER and the BLER of the DUT using the initial frame data bits and the subsequent frame data bits.

13. The method of claim 12, further comprising;
storing the plurality of frames in a storage device as the baseband IQ data is received from the DUT,
wherein processing the at least one subsequent frame further comprises retrieving the at least one subsequent data segment corresponding to the at least one subsequent frame from the storage device.

14. The method of claim 12, wherein the RF signal has a data rate exceeding a processing speed of the signal analyzer.

15. A system for determining a measure of error of a device under test (DUT), the system comprising:
a storage device configured to store baseband data received from the DUT;
a controller configured to retrieve the stored baseband data from the storage device and to segment the retrieved baseband data into a plurality of data segments;
a signal analyzing device comprising a first processing path for determining processing parameters of an initial data segment of the plurality of data segments and processing the initial data segment according to the determined processing parameters, a second processing path for processing subsequent data segments of the plurality of data segments based at least in part on the determined processing parameters of the initial data segment, a switch for switching between the first and second processing paths under control of the controller, and a memory; and
a computer system configured to determine the measure of error of the DUT based on the processed initial data segment from the first processing path and the processed subsequent data segments from the second data path.

16. The system of claim 15, wherein the first processing path determining the processing parameters comprises determining a synchronization pattern location of the initial data segment and estimating a signal impairment of the initial data segment, and processing the initial data segment comprises synchronizing the initial data segment using the determined synchronization pattern location and compensating for the estimated signal impairment, and
wherein the memory is configured to store the determined synchronization pattern location and the estimated signal impairment of the initial data segment.

17. The system of claim 16, wherein the second processing path is configured to synchronize the subsequent data segments using the stored synchronization pattern location of the initial data segment, and to compensate for signal impairments of the subsequent data segments using the stored estimated signal impairment of the initial data segment.

18. The system of claim 15, wherein the measure of error of the DUT comprises at least one of bit error rate (BER) and block error rate (BLER).

19. The system of claim 18, wherein the signal analyzing device further comprises:
a demodulator/decoder configured to demodulate data of the initial data segment received from the first processing path and data of the subsequent data segments received from the second data path, and to decode the demodulated data to generate corresponding data bits.

20. The system of claim 19, wherein the computer system comprises:
- a bit error detection module configured to detect bit errors in the generated data bits by comparing the generated data bits to a reference bit sequence; and
- a BER/BLER calculation module configured to calculate the at least one of the BER and the BLER of the DUT based on the detected bit errors.

* * * * *

UNITED STATES PATENT AND TRADEMARK OFFICE
CERTIFICATE OF CORRECTION

| | | |
|---|---|---|
| PATENT NO. | : 8,578,221 B1 | Page 1 of 1 |
| APPLICATION NO. | : 12/977189 | |
| DATED | : November 5, 2013 | |
| INVENTOR(S) | : Tetsuaki Ikoma et al. | |

It is certified that error appears in the above-identified patent and that said Letters Patent is hereby corrected as shown below:

On Title page, item (75), in "Inventors", in column 1, line 4, delete "Ikura Yoshida" and insert -- Ikuru Yoshida --, therefor.

Signed and Sealed this
Eighteenth Day of March, 2014

Michelle K. Lee
*Deputy Director of the United States Patent and Trademark Office*